US010846689B2

(12) United States Patent
Matthews et al.

(10) Patent No.: US 10,846,689 B2
(45) Date of Patent: Nov. 24, 2020

(54) REDUCING CYBERSECURITY RISKS WHEN PURCHASING PRODUCTS OVER A NETWORK

(71) Applicant: Walmart Apollo, LLC, Bentonville, AR (US)

(72) Inventors: Mark Matthews, Rogers, AR (US); Daniel Eckert, Rogers, AR (US); David Martin Nelms, Rogers, AR (US); Todd Mattingly, Bentonville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 242 days.

(21) Appl. No.: 15/802,904

(22) Filed: Nov. 3, 2017

(65) Prior Publication Data

US 2018/0130053 A1 May 10, 2018

Related U.S. Application Data

(60) Provisional application No. 62/418,359, filed on Nov. 7, 2016.

(51) Int. Cl.
*G06Q 20/38* (2012.01)
*G06Q 20/32* (2012.01)
(Continued)

(52) U.S. Cl.
CPC ..... *G06Q 20/3821* (2013.01); *G06Q 20/3224* (2013.01); *G06Q 20/3276* (2013.01);
(Continued)

(58) Field of Classification Search
CPC .......... G06Q 20/3821; G06Q 20/3224; G06Q 20/40145; G06Q 20/3276; H04W 12/06;
(Continued)

(56) References Cited

U.S. PATENT DOCUMENTS 8,849,706 B2 9/2014 King
9,390,305 B2 7/2016 Scipioni
(Continued)

FOREIGN PATENT DOCUMENTS

WO 2013103912 A1 7/2013

OTHER PUBLICATIONS

International Preliminary Report on Patentability for application No. PCT/US2017/059880 dated May 16, 2019.
(Continued)

*Primary Examiner* — Calvin L Hewitt, II
*Assistant Examiner* — Vincent Idiake
(74) *Attorney, Agent, or Firm* — Schmeiser, Olsen & Watts LLP; Jason A. Murphy (57) ABSTRACT

A computer system, computer program product, and method includes detecting a request for sensitive information to be input by a user, determining that a network is a non-secure network, disabling a sensitive user information input function to prevent the user from entering sensitive information over the unsecure network, generating a unique identifier to be displayed on the computer, wherein the user scans the unique identifier with a mobile device to initiate an automatic transaction over a secure network between the mobile device and the computing system, validating the user operating the mobile device and completing the automatic transaction over the secure network with the mobile device rather than over the unsecure network with the computer.

11 Claims, 8 Drawing Sheets

(51) Int. Cl.

| | |
|---|---|
| *H04W 12/06* | (2009.01) |
| *H04L 29/06* | (2006.01) |
| *G09C 5/00* | (2006.01) |
| *H04L 9/32* | (2006.01) |
| *G07F 7/08* | (2006.01) |
| *G06Q 20/40* | (2012.01) |
| *H04W 12/00* | (2009.01) |

(52) U.S. Cl.
CPC ....... *G06Q 20/40145* (2013.01); *G07F 7/084* (2013.01); *G09C 5/00* (2013.01); *H04L 9/3231* (2013.01); *H04L 63/0861* (2013.01); *H04W 12/06* (2013.01); *H04L 2209/56* (2013.01); *H04L 2209/80* (2013.01); *H04W 12/00503* (2019.01)

(58) Field of Classification Search
CPC ......... H04W 12/00503; H04L 2209/56; H04L 2209/80; H04L 9/3231; H04L 63/0861; G07F 7/084; G09C 5/00
See application file for complete search history.

(56) References Cited

U.S. PATENT DOCUMENTS

| | | |
|---|---|---|
| 2003/0169881 A1 | 9/2003 | Niedermeyer |
| 2009/0319435 A1 | 12/2009 | Little, Jr. et al. |
| 2010/0199086 A1 | 8/2010 | Kuang et al. |
| 2011/0035662 A1 | 2/2011 | King et al. |
| 2011/0137742 A1 | 6/2011 | Parikh |
| 2012/0173351 A1* | 7/2012 | Hanson ................ G06Q 20/204 705/17 |
| 2012/0209749 A1 | 8/2012 | Hammad et al. |
| 2014/0199664 A1 | 7/2014 | Sadeh-Koniecpol et al. |
| 2014/0244442 A1 | 8/2014 | Hirsch |
| 2014/0289107 A1 | 9/2014 | Moshal |
| 2015/0026056 A1* | 1/2015 | Calman ............... G06Q 20/3223 705/42 |
| 2015/0254642 A1* | 9/2015 | Bondesen ............ G06Q 20/363 705/41 |
| 2015/0254653 A1* | 9/2015 | Bondesen ............ G06Q 20/385 705/41 |
| 2015/0269537 A1* | 9/2015 | Steeves .................. H04L 63/08 705/44 |
| 2015/0294294 A1 | 10/2015 | Grinberg et al. |
| 2015/0304842 A1* | 10/2015 | Schultz ................. G06F 16/381 726/4 |
| 2016/0203468 A1 | 7/2016 | Chen |

OTHER PUBLICATIONS

"My eBay for Guests," eBay.com, acessed Aug. 2, 2016.
"Using QR codes for ecommerce," BigCommerce.com Jan. 20, 2015.
Joe Waters, "How to Sell Products or Services Using QR Codes," Dummies.com, accessed Aug. 1, 2016.
Jennifer Bergen, "Korea's Tesco reinvents grocery shopping with QR-code 'stores'," Geek.com, Jun. 18, 2011.
"RedLaser—Barcode and QR Code Scan," AppsforActuaries.org, accessed Aug. 2, 2016.
International Search Report & Written Opinion in International Patent Application No. PCT/US17/59880, dated Jan. 29, 2018; 17 pages.
Office Action in corresponding Canadian Patent Application No. 3,042,534 dated May 2020. 6 pages.

* cited by examiner

REDUCING CYBERSECURITY RISKS WHEN PURCHASING PRODUCTS OVER A NETWORK

RELATED APPLICATIONS

This application claims the benefit of U.S. Provisional Patent No. 62/418,359, filed Nov. 7, 2016, entitled "Secure Payment Processing for Product Displayed on a Public Computer," the contents of which are incorporated by reference herein in their entirety.

TECHNICAL FIELD

The following relates to systems and methods for securely processing sensitive information over a network, and more specifically to embodiments of a method reducing a cybersecurity risk when using a computer to purchase products over a network.

BACKGROUND

A significant percentage of consumers shop online by visiting retailers' website. Often times, consumers use computers or other computing devices that are connected to the Internet over a public network, or the consumers use public or non-personal computers. In these instances, providing personal information or account information is not recommended. However, to purchase a product from a retailer's website, at least some personal information must be provided to complete the transaction. Doing so exposes the consumer to cyber security risks and threats to personal identity theft.

SUMMARY

An embodiment of the present invention relates to a method, and associated computer system and computer program product, for reducing a cybersecurity risk when using a computer to purchase products over a network, the method comprising: detecting, by a processor of a computing system, a request for sensitive information to be input by a user, wherein the user is interacting with a website accessed by the computer to prompt the request, determining, by the processor, that a network associated with the computer is a non-secure network, in response to the detecting, disabling, by the processor, a sensitive user information input function to prevent the user from entering sensitive information over the unsecure network, generating, by the processor, a unique identifier to be displayed on the computer, wherein the user scans the unique identifier with a mobile device to initiate an automatic transaction over a secure network between the mobile device and the computing system, validating, by the processor, the user operating the mobile device, and completing, by the processor, the automatic transaction over the secure network with the mobile device rather than over the unsecure network with the computer.

DETAILED DESCRIPTION

Figure 1:
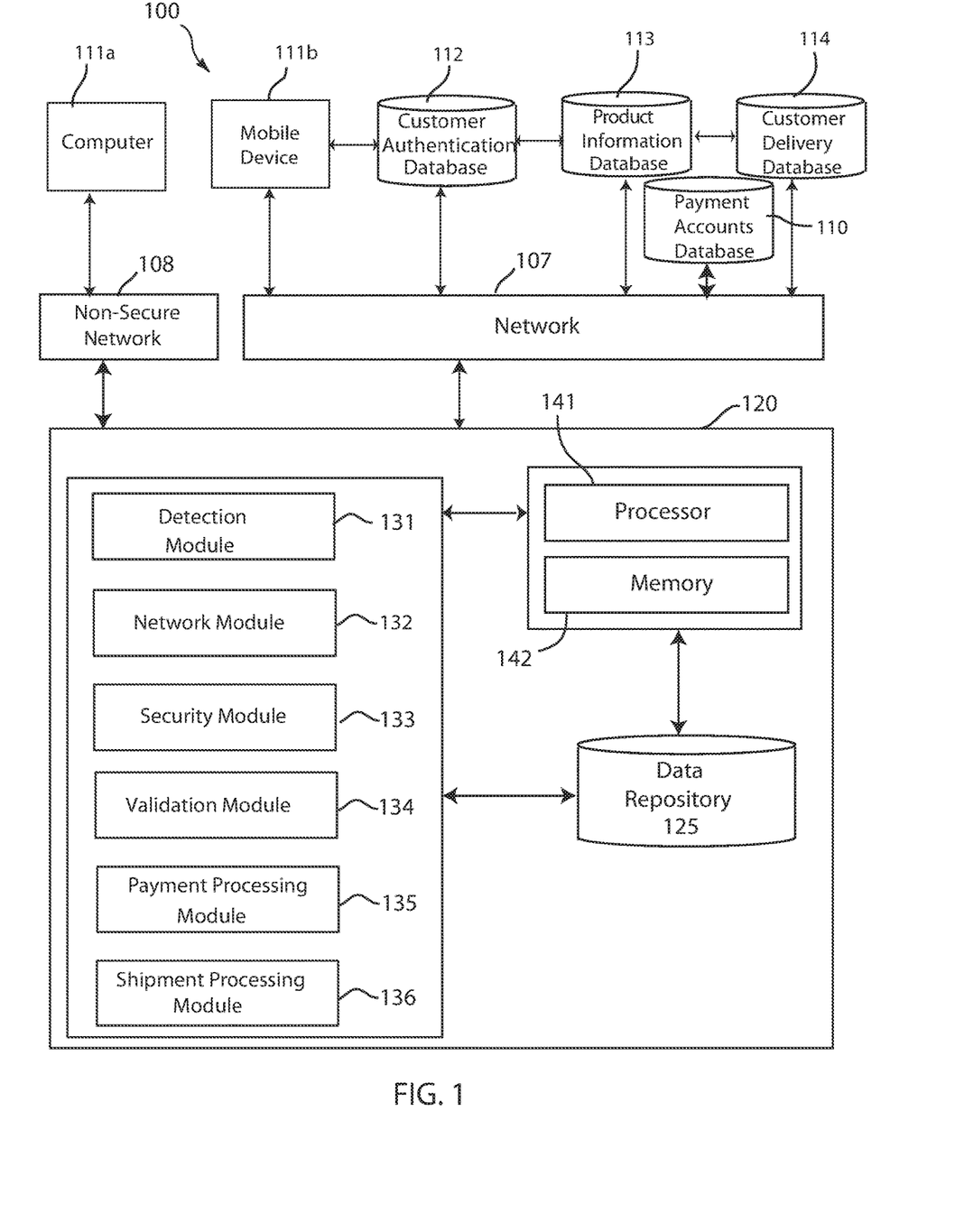
FIG. 1 depicts a block diagram of a secure sensitive information processing system, in accordance with embodiments of the present invention.

Referring to the drawings, FIG. 1 depicts a block diagram of a secure sensitive information processing system 100, in accordance with embodiments of the present invention. Embodiments of the secure sensitive information processing system 100 may be a cybersecurity system, a network security system for processing online transactions, an online transaction security system, and the like. Embodiments of the secure sensitive information processing system 100 may run on one or more servers, servers systems, or other hardware devices, computing devices, and the like. The secure sensitive information processing system 100 may be connected to a computer 111a over network 108. Embodiments of a computer 1111a may refer to a computing device, a desktop computer, a personal computer, a tablet, a terminal, a point of sale (POS) terminal, and the like, that may be connected over a public or otherwise non-secure network. Embodiments of the computer 111a may be located in a public environment, used by members of the public, and/or not belonging to a single user. For example, computer 1111a may be a computer at a library, a computer owned by an employer, a computer connected to the wi-fi at a café, a computing device located at a mall, or any computer that may be at an increased risk of identity theft, cyberattacks, etc. Further embodiments of a computer 111a may include personal computers owned by the user, but may be connected to a public or exposed network. Further embodiments of a computer 111a may be a computer owned by another user, wherein the user is using or borrowing the other user's computer to online shop, even if connected to a trusted network. In an exemplary embodiment, the computer 111a may be a public computer, available in a retailer, store, shopping center, and the like. In further exemplary embodiments, the computer 111a may be a computing device connected to the Internet over network 108, which may be a non-secure network, unsecure network, public network, compromised network, vulnerable network, etc. A user may interact with the computer 111a in a public or private environment to browse various websites for items to purchase over the Internet.

Embodiments of the secure sensitive information processing system 100 may also be connected to a mobile device 111b over network 107. Embodiments of mobile device 111b may be a computing device, a cell phone, a smartphone, a tablet computer, or any mobile computing device that may have a camera application and GPS functionality. In an exemplary embodiment, the mobile device 111b may be a user device associated with the user of the computer 111a. The secure sensitive information processing system 100 may receive one or more communications from a mobile device 111b of a user when a user scans a unique identifier that may be present on a screen of the computer 111a, as well as receive current biometric data from the mobile device 111b.

Embodiments of secure sensitive information processing system 100 may include a computing system 120 coupled to a network 107. Computing system 120 may be a computing device, one or more computing devices, a hardware device, a storage device, a server, one or more servers, a server system, and the like. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture. Embodiments of network 107 may be comprised of more than one network.

In some embodiments, the network 107 may further comprise, in addition to the computer system 120, a connection to one or more network accessible knowledge bases containing information of the user, network repositories or other systems connected to the network 107 that may be considered nodes of the network 107. In some embodiments, where the computing system 120 or network repositories allocate resources to be used by the other nodes of the network 107, the computer system 120 and network repository 114 may be referred to as servers.

The network repository may be a data collection area on the network 107 which may back up and save all the data transmitted back and forth between the nodes of the network 107. For example, the network repository 114 may be a data center saving and cataloging user transactions with a retailer, to generate both historical and predictive reports regarding a particular user. In some embodiments, a data collection center housing the network repository may include an analytic module capable of analyzing each piece of data being stored by the network repository. Further, the computer system 120 may be integrated with or as a part of the data collection center housing the network repository. In some alternative embodiments, the network repository may be a local repository (not shown) that is connected to the computer system 120.

Referring still to FIG. 1, embodiments of the computer system 120 may be equipped with a memory device 142 which may store the various user information, transactions, product information, mobile payment account information, and the like, and a processor 141 for implementing the tasks associated with the secure sensitive information processing system 100.

Furthermore, embodiments of computer system 120 may include a detection module 131, a network module 132, a security module 133, a validation module 134, a payment processing module 135, and a shipment processing module 136. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Figure 2:
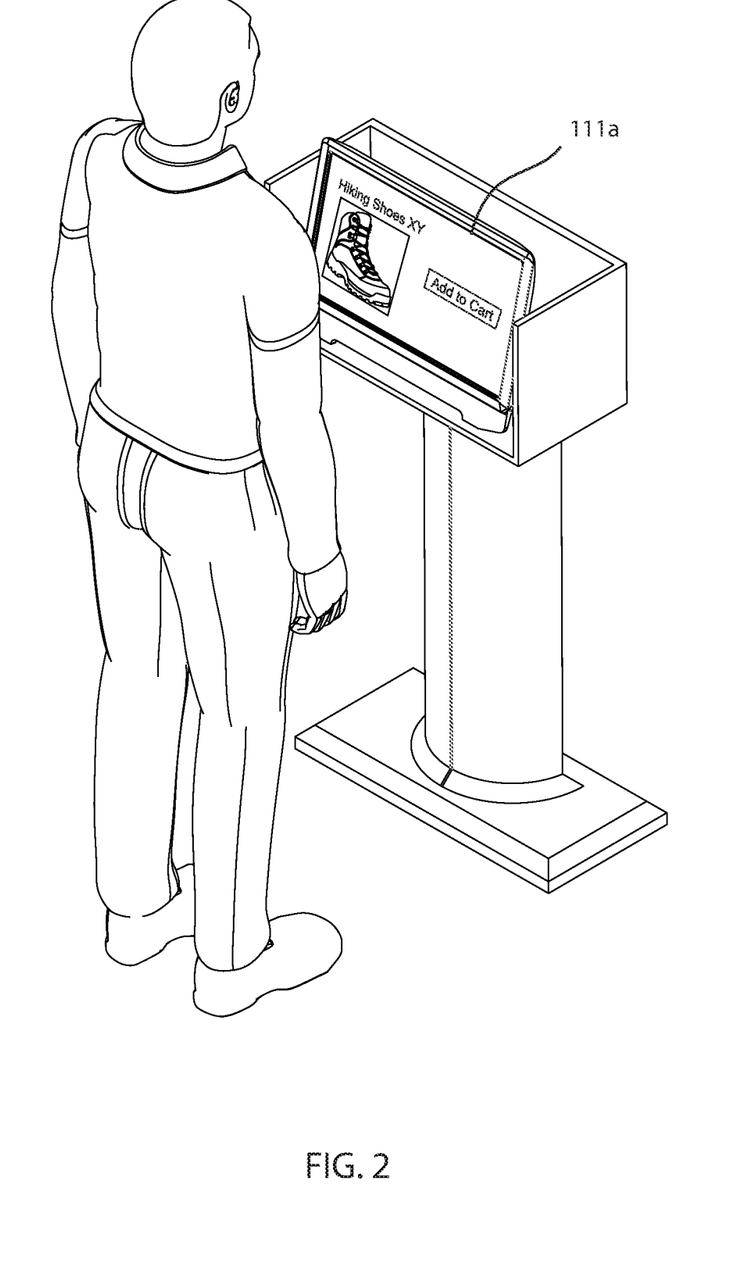
FIG. 2 depicts a view of a computer in a public environment, in accordance with embodiments of the present invention.

With continued reference to FIG. 1, and additional reference to FIG. 2, embodiments of the detection module 131 may include one or more components of hardware and/or software program code for detecting a request for sensitive information to be input by a user. For instance, if a user is interacting with a website accessed by the computer 111a, the user may browse the website looking for products to purchase online using the computer 111a. Should the user to decide to purchase one or more products on the website, or wish to log on to the website, sign-up for a newsletter, etc., the web site may prompt the user to enter user sensitive information using computer 111a. The sensitive information may be sensitive user information, user information, identification information, personal information, private information, payment information, user credit card information, user bank information, user contact information, and the like. Embodiments of the detection module 131 may detect, recognize, determine, etc. that the website is prompting the user to input the sensitive information. In an exemplary embodiment, the detection module 131 may detect that the computer 111a is accessing a page of the website that enables data input via computer 111a. Other techniques may be used to detect the request for sensitive data input by the website via computer 111a.

Furthermore, embodiments of the network module 132 may include one or more components of hardware and/or software program code for determining that a network 108 associated with the computer is a non-secure network, in response to the detecting to the request for sensitive information. For instance, embodiments of the network module 132 of the computing device 120 may determine that the network 108 is unsecure by analyzing an IP address of the computer 111a. The IP address of the computer 111a may reveal that the computer 111a is a known public computer in a known public location, which is known to use a public or non-secure network. Additionally, the IP address may reveal whether the computer 111a is connected to the Internet over a public or non-secure network. Embodiments of the network module 132 may thus determine whether the computer that a user is using to purchase goods online is doing so over a public network. Further, embodiments of the network module 132 may ping, poll, analyze, etc. the network 108 to characterize and/or determine a security risk associated with the network 108. A combination of network testing techniques and IP address analysis may be performed by the network module 132 of the computing system 120.

The network module 132 may determine whether the computer 111a is connected to a website over a non-secure network at any point during the browsing of the website. In an exemplary embodiment, the network module 132 may determine the security of the network (e.g. non-secure, unsure, partially safe, high risk, compromised, etc.) in response to a request for the user to enter sensitive information using the computer 111a over network 108.

Figure 3:
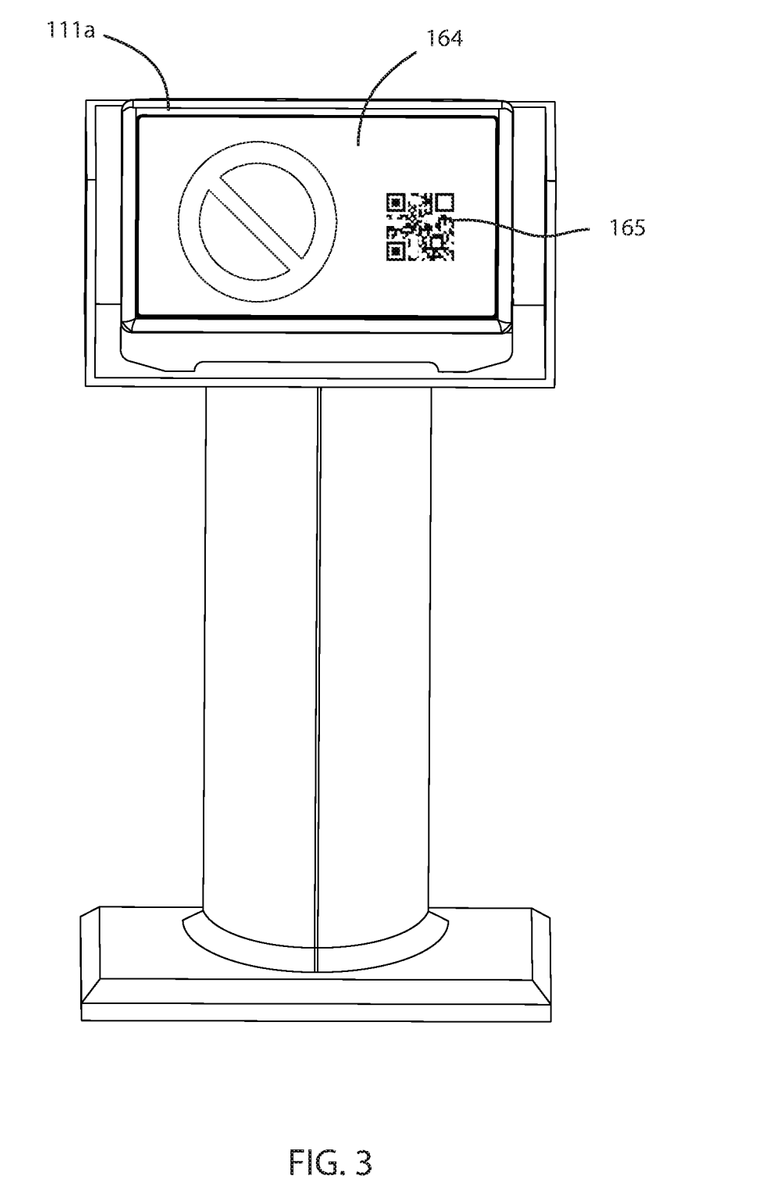
FIG. 3 depicts a view of the computer of FIG. 2, wherein a unique identifier is displayed on the screen of the computer, in accordance with embodiments of the present invention.

Referring still to FIG. 1, and now with additional reference to FIG. 3, embodiments of the security module 133 may include one or more components of hardware and/or software program code for disabling a sensitive user information input function to prevent the user from entering sensitive information over the unsecure network, and generating a unique identifier to be displayed on the computer 111a. For instance, embodiments of the security module 133 may disable, lock, alter, prevent, freeze, remove, etc., a data input function of the website connected to computer 111a, in response to determining that the network 108 is non-secure. In other words, the security module 133 may disable a functionality of the computer 111a to prevent a user from inputting sensitive information using computer 111a, which can be exposed to cybersecurity risks, identity theft, bank fraud, etc. due to a lack of a secure network connection. In an exemplary embodiment, a user operating the computer 111a cannot enter, even if the user wanted to, the user's sensitive information because the security module 133 of the computing system has disabled one or more functions of the computer 111a. The security module 133 may send a notification to be displayed that that the online transaction has been interrupted for security reasons, and that the user needs to follows steps displayed on the screen to continue the online transaction.

Embodiments of the security module 133 may generate a unique identifier 165 to be displayed to the user on the screen 164 of the computer 111a so that the user can continue with the online transaction over a secure network (e.g. 4G/LTE cellular network) using a mobile device 111b. Embodiments of the unique identifier may be at least one of a QR code, a bar code, a UPC code, a SKU number, an encrypted token, a photograph of a product, and the like, which may be encoded with information associated with a product that the user intends to purchase, or with a URL directing the user to the same webpage prior to disabling. Embodiments of the unique identifier may be displayed on the screen of the computer, as shown in FIG. 3.

Figure 4:
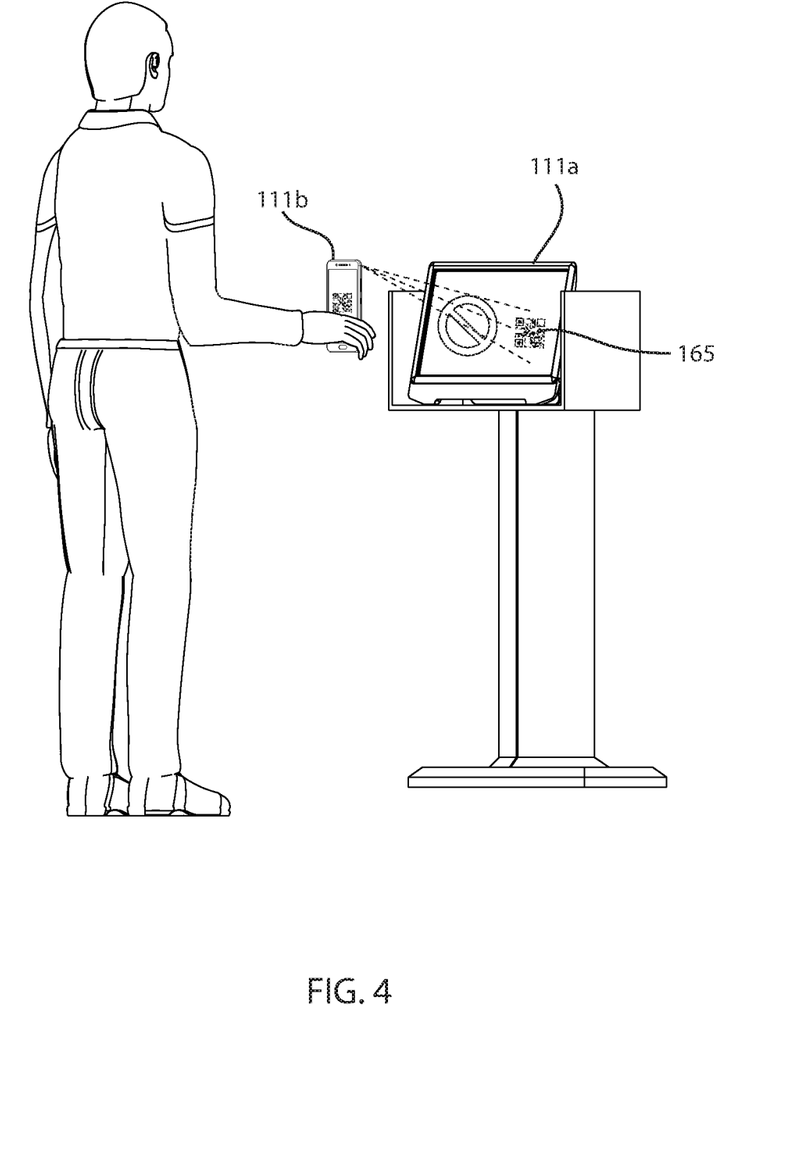
FIG. 4 depicts a user scanning the unique identifier displayed by the computer of FIG. 3, in accordance with embodiments of the present invention.

A user may scan the unique identifier 165 displayed on the computer 111a with a mobile device 111a to initiate an automatic transaction over a secure network, such as network 107 between the mobile device 111b and the computing system 120, as shown in FIG. 4. For instance, the security module 133 may receive a communication from a mobile device 111a that has scanned a unique identifier 165 displayed on a screen 164 of a computer 111a connected to the Internet over non-secure network 108. Embodiments of the mobile device 111b may be a mobile device of a user that is operating or otherwise utilizing the computer 111a to online shop on a retailer's website. The mobile device 111a may be a mobile computing device, a smartphone, a tablet, a cellular phone, a camera, or other internet connected mobile computing device. Embodiments of the mobile device 111a may be equipped with or communicatively coupled to a camera to photograph, scan, analyze, or otherwise capture, and process the unique identifier 165 associated with a product, transaction, login function, contact form request, etc. from the website accessed by the computer 111a. For instance, store product 160 may be displayed on a screen 164 of the computer 111a that is accessing the website of a retailer, and when the user attempts to purchase the product (e.g. initiating a sensitive information input functionality), the security module 133 may generate a unique identifier 165, such as a QR code, that is encoded with information for the a potential transaction associated with the product 160 to be automatically processed over secure network 107 using the mobile device 111b, after the disabling of the sensitive information input functionality. The information encoded in the unique identifier 165 may include details of the product 160 and/or transaction, such as data and/or information relating to a product, such as product information, price, options, similar models, specifications, various colors, sizes, manufacturer information, etc., and custom details/selections previously customized by the user prior to initiating a sensitive information input functionality, such as quantity, size, color ("user customization data").

In situations where a user desires to purchase a product 160 when using the computer 111a, a user may scan or otherwise process the unique identifier 165 associated with the desired product 160 displayed on the screen 164 with the mobile device 111b. Embodiments of the product 160 may include products, items, merchandise, packages, etc. that are available for purchase over the Internet from a retailer's website. Embodiments of the security module 133 may receive the communication or transmission from the mobile device 111a, which can send the data/information relating to the product 160 when the unique identifier 165 is scanned by the mobile device 111b. In an exemplary embodiment, the unique identifier 165 is spawned or otherwise presented on the retailer's website after a sensitive information data input functionality is disabled, preventing the user from entering sensitive information into the computer 111a. In other words, the unique identifier 165 may be generated and displayed without needing a specific request by the user to spawn or otherwise display the unique identifier 165. In some embodiments, the security module 133, or other module of the computing system 120, may spawn, distribute, display, etc. the unique identifier 165, or may instruct another server to spawn, distribute, display, etc., the unique identifier 165. Accordingly, if a user desires to purchase a product 160 from a retailer's website while shopping on a public computer, such as computer 111a, the user can be forced to use the user's mobile device 111b to scan a unique identifier 165 associated with the product 160 to initiate a purchase and shipment of the product, without having to provide personal information or logging into an account on the computer 111a connected to the Internet via a non-secure network.

In an alternative embodiment, the security module 133 may receive a communication from a mobile device 111b that has scanned or captured an image of the product 160 from the display 164 of the computer 111a. For instance, the security module 133 may encode an image on the website with the same encoded information of the unique identifier 165, so that the user may photograph the image of the product 160 instead of a separate step of spawning a QR code. The encoded image information/data may be transmitted to the security module 133, which may query a products information database 113 to determine which product the user desires to purchases, and initiate the automatic transaction relating to the specific product contained in the image.

In yet another embodiment, the security module 133 may receive a communication from the mobile device 111b, wherein a user used the mobile device 111b to scan a unique identifier 165 for product 160 displayed on the computer 111a to obtain information on similar or related products. In response, the security module 133 may retrieve or otherwise receive information/data from a product information database 113. The information retrieved/received from the product information database 113 by the security module 133 in response to receiving the communication from the mobile device 111b that has scanned a unique identifier 165 may be related products, similar products, related model numbers, specifications, competitive products, similar products bought by users, expert reviews of similar products, images of related or similar products, and the like. The security module 133 may then transmit this information to the mobile device 111b for presenting to the user over the secure network 107. The user may then select an option to purchase a related or similar product, the selection of which being communicated to the computing system 120 by the mobile device 111, and further processed by the computing system 120, over the secure network 107, rather than over a non-secure network, such as network 108.

Figure 5:
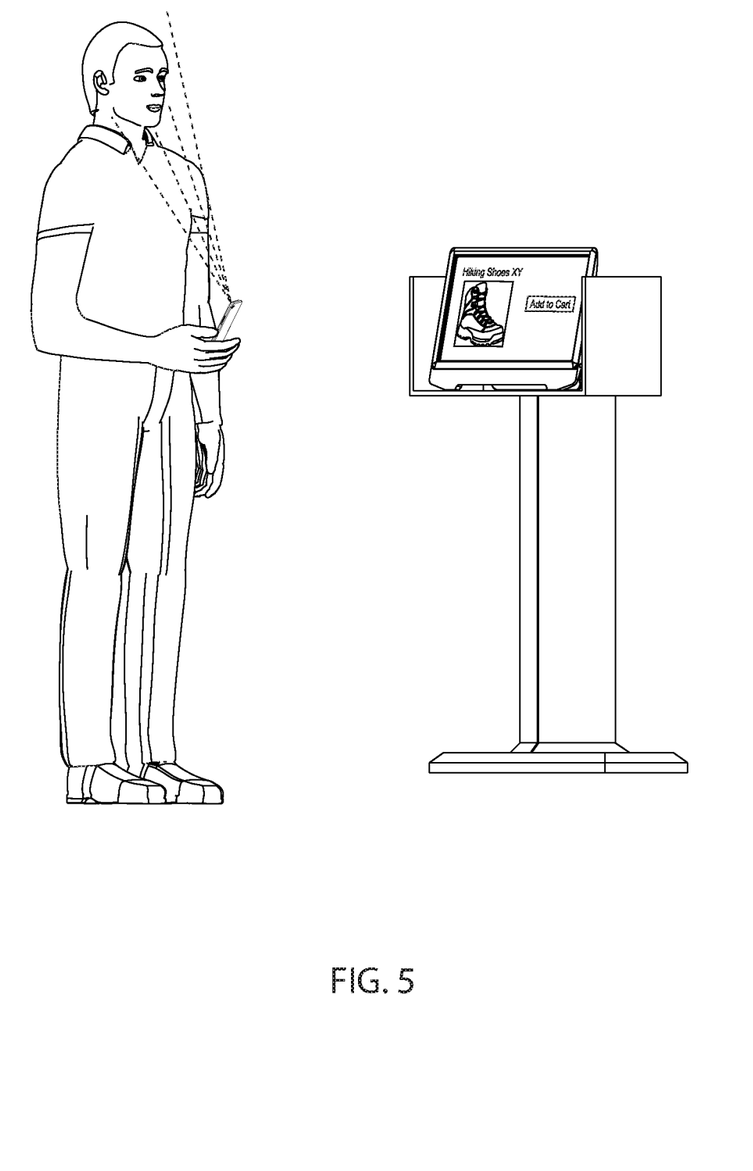
FIG. 5 depicts a user physically present within a predetermined proximity of the computer of FIG. 4, wherein a biometric data of the user is obtained by a user mobile device, in accordance with embodiments of the present invention.

Prior to automatically processing the transaction after the user scans a unique identifier 165, the user may be validated, authenticated, or otherwise verified to further reduce cybersecurity risks for online purchases. With continued reference to FIG. 1, and additional reference to FIG. 5, embodiments of the computing system 120 may further include a validation module 134. Embodiments of the validation module 134 may include one or more components of hardware and/or software program code for validating the user operating the mobile device 111b by i) acquiring a geographical location of the mobile device 111b and determining that the mobile device 111b is located within a predetermined proximity of the computer 111a, and/or ii) authenticating the user using a biometric data of the user obtained by the mobile device 111b. For example, the validation module 134 may obtain a GPS information/signal from the mobile device 111b to determine a geographical and/or physical location of the mobile device 111b. Alternatively, the validation module 134 may determine a location of the mobile device 134 via one or more beacon devices placed throughout an environment, such as a public environment or other venue. Other techniques may be used to determine an exact location of the mobile device 111b, as well as the user, by analyzing one or more network connected cameras placed through an environment, such as a public location or other venue. Moreover, embodiments of the validation module 134 may determine a location of the computer 111a. In an exemplary embodiment, the location of the computer 111a may be determined when analyzing the IP address of the computer 111a. The location of the computer 111a may also be known to the computing system 120, or may be determined by accessing a database storing location information of the computers 111a. For example, a retailer may place computers 111a in various locations within a retail environment or public venue, and record the GPS location of the computer 111a after placement, wherein the GPS information may be stored in a database accessible by the computing system 120 over network 107.

Embodiments of the validation module 134 may then determine whether the geographic location of the mobile device 111b is within a predetermined proximity to the computer 111a or other internet connectable device. For example, the validation module 134 may be determining whether the mobile device 111b is within 3 feet, 5 feet, 10 feet, or other physical length or distance from the computer 111a or other specific internet connected device. Close proximity between the mobile device 111b and the computer 111a may indicate that the user is actually physically present, and not a result of a computer hacking event. Furthermore, the validation module 134 may require that the user perform a task to verify a presence of the user nearby the computer 111a. Similarly, the validation module 134 may determine if the mobile device 111b is within a proximity of an internet connected device, other than the computer 111a. For instance, the validation module 134 may determine whether the mobile device 111b is close enough to an internet connected appliance, a smart speaker, a digital internet connected assistant device, and the like. Further, a type of internet connected device may be a basis for determining which type of purchase or class of goods may be purchased. As an example, groceries may only be purchased if the user is within a certain proximity of an internet connected refrigerator. The validation process may then authenticate the user using biometric data from a sensor/scanner on the mobile device 111b, and also verify that the mobile device 111b is within a certain proximity of a particular device, which may vary depending on the a type of class of good/service. The validation module 134 may prompt the user to walk to the internet connected device attributed to a certain type of good, after determining whether the purchase involves a particular type of good that requires an additional security validation. Accordingly, embodiments of the validation module 134 may require multiple levels of "keys" to approve or otherwise validate a purchase using computer 111a.

In another embodiment, the validation module 134 may instruct the mobile device 111b to display a location using a maps application, and request the user walk to a specific geographic location nearby the computer. As the user walks to the specific spot, the GPS information of the mobile device 111b may change and eventually correspond or sufficiently correspond to the specific spot the validation module 134 has selected. The specific spot may be randomly selected, or may be a same spot each time nearby the computer 111a, wherein indicia on a floor nearby the computer 111a may be placed to assist the user in finding the specific spot for verification purposes. In another embodiment, the validation module 134 may also require, in addition to confirming close proximity with the computer, that the user perform a gesture with the mobile device 111b to further confirm a physical presence of the user. For example, the validation module 134 may request that the user shake the mobile device 111b, tilt the mobile device 111b, rotate the mobile device 111b, etc., using sensor data (e.g. accelerometer) of the mobile device 111b to confirm the activity. Thus, embodiments of the validation module 134 may confirm a physical and active presence of a user nearby the computer 111a.

Verifying, validating, or authenticating the user operating the mobile device 111b may further include obtaining a biometric data, or other identifying data, to confirm an identity of the user in addition to confirming a physical and potentially an active presence of the user Embodiments of the validation module 134 may query one or more databases, such as a customer authentication database 112 to authenticate a user of a mobile device 111b. Embodiments of the customer authentication database 112 may be one or more databases, storage devices, repositories, and the like, that may store or otherwise contain information and/or data regarding personal account information of a user, such as name, account identifiers, passwords, pin numbers, address information, other personal identifying information and the like, that may be associated with a mobile application on the mobile device 111b of the user. The customer authentication database 112 may be accessed over network 107, and may be managed and/or controlled by a third party, or by a retailer associated with the mobile application on the user's mobile device 111b. Embodiments of the validation module 134 may retrieve, receive, obtain, derive, etc. authenticating information from the customer authentication database 112. For instance, the validation module 134 may query the customer authentication database 112 to further confirm an identify a user of the mobile device 111b that transmitted the communication to the security module 133 to process a purchase of the product whose unique identifier 165 was scanned by the mobile device 111b. Once an identity is established and/or confirmed, the validation module 134 may request that the identity be further confirmed by the mobile device 111b. In an exemplary embodiment, the validation module 134 may request that the mobile device 111b transmit identifying information in response to the request by the validation module 134, such as a pin number, a password, a login information, a biometric identifier, such as a fingerprint, voice signature, facial expression data, and the like. In other embodiments, the validation module 134 may confirm identifying information that is sent by the mobile device 111b when the product's unique identifying information is communicated to the computing system 120. For example, if a user logs in to a mobile application on the user's mobile device 111b that is associated with a particular retailer, and opens the mobile application to use a function of the mobile application that enables the user to use device's camera to scan a unique identifier 165 of a product found using a computer 111a, then user identifying information may be communicated by the mobile application on the mobile device 111b to the computing system 120. Embodiments of the validation module 134 may verify or otherwise authenticate the user identifying information by comparing the received identifying information with the user identifying information retrieved or received from the customer authentication database 112.

Furthermore, in response to the scanning of the unique identifier 165, embodiments of the validation module 134 may automatically retrieve biometric data of the user, automatically sending an instruction to the mobile device 111b to initiate a biometric sensor. For example, the user may use the mobile device 111a to scan the unique identifier 165, and soon after scanning or simultaneous to the scanning the mobile device 111b may be instructed to capture biometric information/data of the user using a facial identification sensor on the mobile device 111b. Thus, a face of the user, at any particular angle, may be automatically scanned by the facial recognition sensor (e.g. located on a front or back of the mobile device 111b) in response to launching a camera application to capture the unique identifier 165. In addition, the validation module 134 may automatically instruct the mobile device 111a to prompt the user to enter biometric data via a fingerprint/thumb sensor, voice recognition functionality, retina scanner, and the like.

In addition, the validation module 134 may further use payment account information to authenticate, verify, confirm, etc. the user of the mobile device 111b. For example, the validation module 134 may query one or more databases, such as a payment accounts database 110 to further confirm or authenticate the user. Embodiments of the payment accounts database 110 may be one or more databases, storage devices, repositories, and the like, that may store or otherwise contain information and/or data regarding one or more payment instruments associated with the user and the user's mobile application on the mobile device 111b. The payment accounts database 110 may also be accessed over network 107, and may be affiliated with, managed, and/or controlled by one or more financial institutions, issuers, authorizers, and the like. Embodiments of the validation module 134 may query the payment accounts database 110 to identify a user of the mobile device 111b that transmitted the communication to the computing system 120 to process a transaction scanned by the mobile device 111b, based on one or more payment instruments associated with the user. Payment instruments may be a bank account, a credit card account, a debit card, a checking account, an electronic gift card, and the like. Embodiments of the validation module 134 may retrieve or otherwise receive payment instrument information stored on the mobile device 111b or stored on a remote server servicing the mobile device 111b, and may compare the information to authenticate the user of the mobile device 111b. In other embodiments, the validation module 134 may confirm identifying information that is sent by the mobile device 111b when the unique identifying information is communicated to the computing system 120. For example, if a user logs in to a mobile application on the user's mobile device 111b that is associated with a particular retailer, and opens the mobile application to use a function of the mobile application that enables the user to use device's camera to scan a unique identifier 165 of product 160 displayed on a screen 164 of computer 111a, then user payment account information may also be communicated by the mobile application on the mobile device 111b to the computing system 120 over the secure network 108. Embodiments of the validation module 134 may verify or otherwise authenticate the user identifying information by comparing the received payment account information with the payment account information retrieved or received from the payment accounts database 110.

Accordingly, embodiments of the validation module 134 may use a plurality of authentication techniques in combination to validate the user of the mobile device 111b trying to make an online purchase.

Referring still to FIG. 1, embodiments of the computing system 120 may further include a payment processing module 135. Embodiments of the payment processing module 135 may include one or more components of hardware and/or software program code for automatically completing the online transaction over the secure network, after the user has been validated. For instance, the payment processing module 135 may receive payment information and instructing payment for a product scanned by a mobile device 111b. For example, the payment processing module 135 may receive payment processing information from the mobile device 111b. Alternatively, the payment processing module 135 of the computing system 120 may communicate with an application loaded on the user's mobile device 111b to access a local storage of the mobile device 111b, which may contain data regarding payment accounts or payment instruments. In another embodiment, the payment processing module 135 may communicate with a remote server or remote storage device that may include data regarding a payment account or payment instrument associated with an application loaded on the customer's mobile device 111b. Moreover, embodiments of the payment processing module 135 may also access customer preferences that may be saved on the mobile device 111b or to servers servicing the mobile device's operation of the mobile application to determine a preferred payment method or a preferred payment instrument to be used for purchasing. The customer's preferences may also indicate an alternative payment instrument to be used in the event the payment instrument selected as a default expires, or cannot be processed over the network 107 at the time of the purchase.

Embodiments of the payment processing module 135, in response to receiving, obtaining, retrieving, or otherwise determining a payment method, account, instrument, etc. of the user to be used for paying for the scanned product, may instruct or direct a payment processing application to process and complete the payment for the scanned product. For instance, the payment processing module 135 may transmit, send, direct, or provide instruction to a payment processing application to utilize the user's payment account information to complete the purchase. Embodiments of a payment application may be a mobile application associated with a retailer, a third party application, such as an application managed by a bank or financial institution, or any application that facilitates a transfer of currency from the user's account to the retailer's account, in response to receiving the instruction from the payment processing module 135. Alternatively, the payment processing module 135 may process the payment for the scanned product. In response to receiving the payment instrument information of the user, the payment processing module 135 may transact with a third party application to complete the purchase.

Embodiments of the computing system 120 may further include a shipment processing module 136. Embodiments of the shipment processing module 134 may include one or more components of hardware and/or software program code for receiving shipment information and directing shipment of the purchased product to a preferred location of the user. For example, the shipment processing module 136 may receive shipment processing information from the mobile device 111*b*. In an exemplary embodiment, the mobile device 111*b* may transmit shipment information along with the unique identifier information of the product, or as a separate transmission. Alternatively, the shipment processing module 136 of the computing system 120 may communicate with an application loaded on the user's mobile device 111*b* to access a local storage of the mobile device 111*b*, which may contain data regarding shipping destinations, such as a home address of the user, an office address, or frequently shipped to destinations. In another embodiment, the shipment processing module 136 may communicate with a remote server or remote storage device that may include data regarding shipment destinations associated with an application loaded on the customer's mobile device 111*b*. Moreover, embodiments of the shipment processing module 136 may also access customer preferences that may be saved on the mobile device 111*b* or to servers servicing the mobile device's operation of the mobile application to determine a preferred shipping location or method. The customer's preferences may also indicate an alternative shipping location or instruction to be used in the event the shipping destination selected as a default cannot be processed over the network 107 at the time of the purchase.

Furthermore, embodiments of the shipment processing module 136, in response to receiving, obtaining, retrieving, or otherwise determining a preferred shipping location of the user to be used for shipping the purchased product, may instruct or direct a shipment processing application to process and complete the shipping of the scanned product to the preferred location. For instance, the shipment processing module 136 may transmit, send, direct, or provide instruction to a shipment processing application to accomplish the shipping of the purchased product. Embodiments of a shipment application may be a mobile application associated with a delivery services company, organization, or department, or a third party application, such as an application managed by a courier service, a delivery service, a mail delivery service, or any application that facilitates a shipment of a product to a preferred location of a user, in response to receiving the instruction from the shipment processing module 136. Alternatively, the shipment processing module 136 may process the shipment for the scanned product. In response to receiving the shipment information of the user, the shipment processing module 134 may transact with a third party application to complete the shipment.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention). Moreover, embodiments of the secure sensitive information processing system 100 may improve cybersecurity technology and identity theft technology by preventing user from entering sensitive over a non-secure network. The solution is necessarily rooted in computers because computing devices are used to alter website and other computer functionalities to reduce a cybersecurity risk. This may improve fraud and identity theft technology by verifying the customer who initiates a request to purchase a product from a retailer, and allows users to avoid providing personal information to a public computer and/or over a public network to complete a purchase while shopping online.

Figure 6:
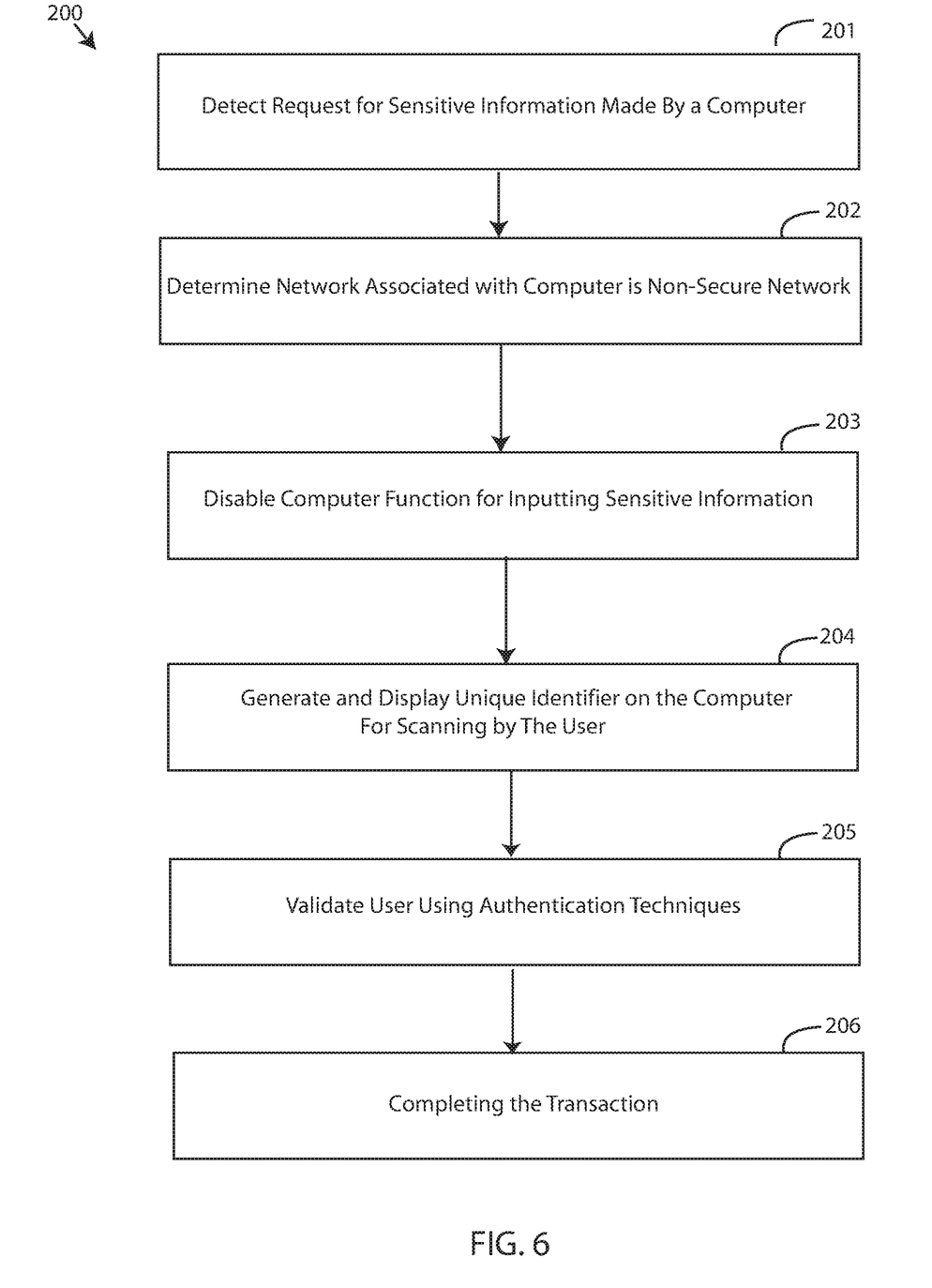
FIG. 6 depicts a flow chart of a method for reducing a cybersecurity risk when using a computer to purchase products over a network, in accordance with embodiments of the present invention.

Referring now to FIG. 6, which depicts a flow chart of a method 200 for reducing a cybersecurity risk when using a computer to purchase products over a network, in accordance with embodiments of the present invention. One embodiment of a method 200 or algorithm that may be implemented for reducing a cybersecurity risk when using a computer to purchase products over a network in accordance with the secure sensitive information processing system 100 described in FIGS. 1-5 using one or more computer systems as defined generically in FIG. 8 below, and more specifically by the specific embodiments of FIGS. 1-5.

Embodiments of the method 200 for reducing a cybersecurity risk when using a computer to purchase products over a network, in accordance with embodiments of the present invention may begin at step 201 wherein a request for sensitive information made by computer 111*a* is detected. For example, if a user initiates a data input functionality while browsing a website using computer 111*a*, the computing system 120 may detect the initiation of the data input functionality. Step 202 determines that the network 108 associated with the computer 111*a* is not 100% secure, for example, unsecure, non-secure, public, and the like. In response to the determining that the network 108 is not secure, step 203 disables the computer functionality for inputting sensitive information, which may be at risk given the non-secure status of the network 108 connecting the computer 111*a* to the Internet. In the disabled state, the user may be prevented from entering sensitive personal, private, and/or financial information using the computer 111*a*. Step 204 generates for display a unique identifier 165, such as a QR code, on the computer 111*a* for scanning by the user. For instance, the computing system 120 may flash, display, spawn, generate, or otherwise provide a QR code on the website and/or computer 111*a*, which the user may scan, photograph or otherwise capture for switching to a secure network (e.g. 4G/LTE or cellular network, secure wi-fi network, etc.) to initiate an automatic processing function. Prior to completing the automatic transaction processing function, step 205 validates the user using one or more authentication techniques, as described above. Step 206 completes the automatic transaction process for the validated user, including automatic payment processing and shipping, in the case of an online transaction to purchase a good.

Figure 7:
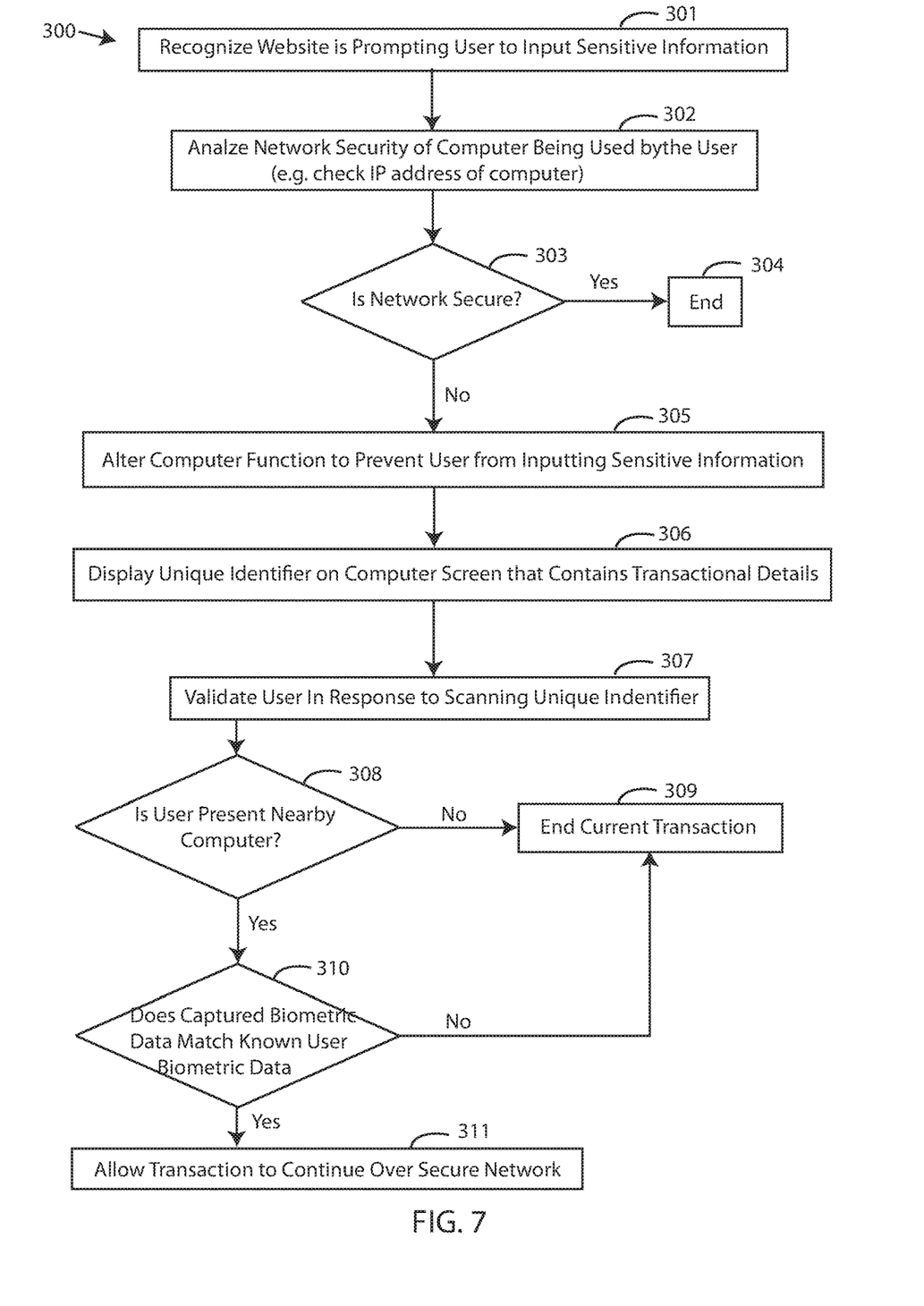
FIG. 7 depicts a detailed flow chart of a method for reducing a cybersecurity risk when using a computer to purchase products over a network, in accordance with embodiments of the present invention.

FIG. 7 depicts a detailed flow chart 300 of a method 200 for reducing a cybersecurity risk when using a computer to purchase products over a network, in accordance with embodiments of the present invention. Step 301 recognizes that a website accessed using computer 111*a* is prompting the user to enter sensitive information. Step 302 analyzes a network security of the computer 111*a* being used by the user. Step 303 determines whether the network is secure or not secure. If the network is secure, then step 304 ends the method, and does not interfere with the online transaction because the network is secure and a risk of cybersecurity is lower than if the network was a secure network. If the network is not secure, step 305 alters a computer functionality to prevent the user from inputting sensitive information using the computer 111*a*. Step 306 displays a unique identifier, such as a QR code, on the computer screen, containing transactional details of the halted transaction. Step 307 validates the user in response to the user scanning the displayed QR code. For validating the user, step 308 determines whether the user is present nearby the computer 111*a*. If the user is not present nearby the computer, step 309 ends the current transaction because it may concluded that a hacking event may be taking place. If the user is present nearby the computer 111*a* (e.g. within a predefined proximity), step 310 determines whether a biometric data obtained from the user's mobile device in response to the scanning matches a previously authenticated biometric signature of the user. If not, the method returns to step 309 and the current transaction is ended and/or cancelled. If yes, step 311 allows the transaction to continue over a secure network.

The following scenario is described for exemplary purposes to show an embodiment of the implementation of method 200, 300:

A businessperson staying at a hotel on a business trip would like to shop online for a gift for the businessperson's child. The businessperson heads to the lobby of the hotel to use the hotel's computer. After browsing for some time on the hotel's computer, which is connected to the Internet over the hotel's free, public wi-fi, the businessperson settles on a new pair of shoes for the businessperson's child. As the user attempts to login to the retailer's website, the data input functionality of the retailer's website is disabled, as well as a data input function of the hotel's computer, so the businessperson cannot enter sensitive information. In response to the disabling, the hotel's computer now displays a QR code on the screen. The businessperson launches a mobile application associated with the retailer on the businessperson's smartphone, logs in (or is automatically logged in upon opening the application) and scans the QR code located on the same webpage as the pair of shoes, displayed on the screen of the hotel computer. The businessperson, sitting 2 feet away from the computer, is prompted to shake the smartphone for validation. Upon shaking the smartphone (and being within 4 feet of the hotel computer, the businessperson is validated and the pair of shoes is automatically purchased and instructed to be shipped to the businessperson's home, based on information retrieved from the businessperson's mobile account associated with the businessperson's smartphone.

Accordingly, embodiments of method 200 for reducing a cybersecurity risk when using a computer to purchase products over a network may be implemented to allow users to use public computers to browse retailers' websites for products to purchase, with the ability to finalize a purchase for the product without having to send or provide personal or financial information of the user to the public computer and/or over a public network, or other non-secure network.

Figure 8:
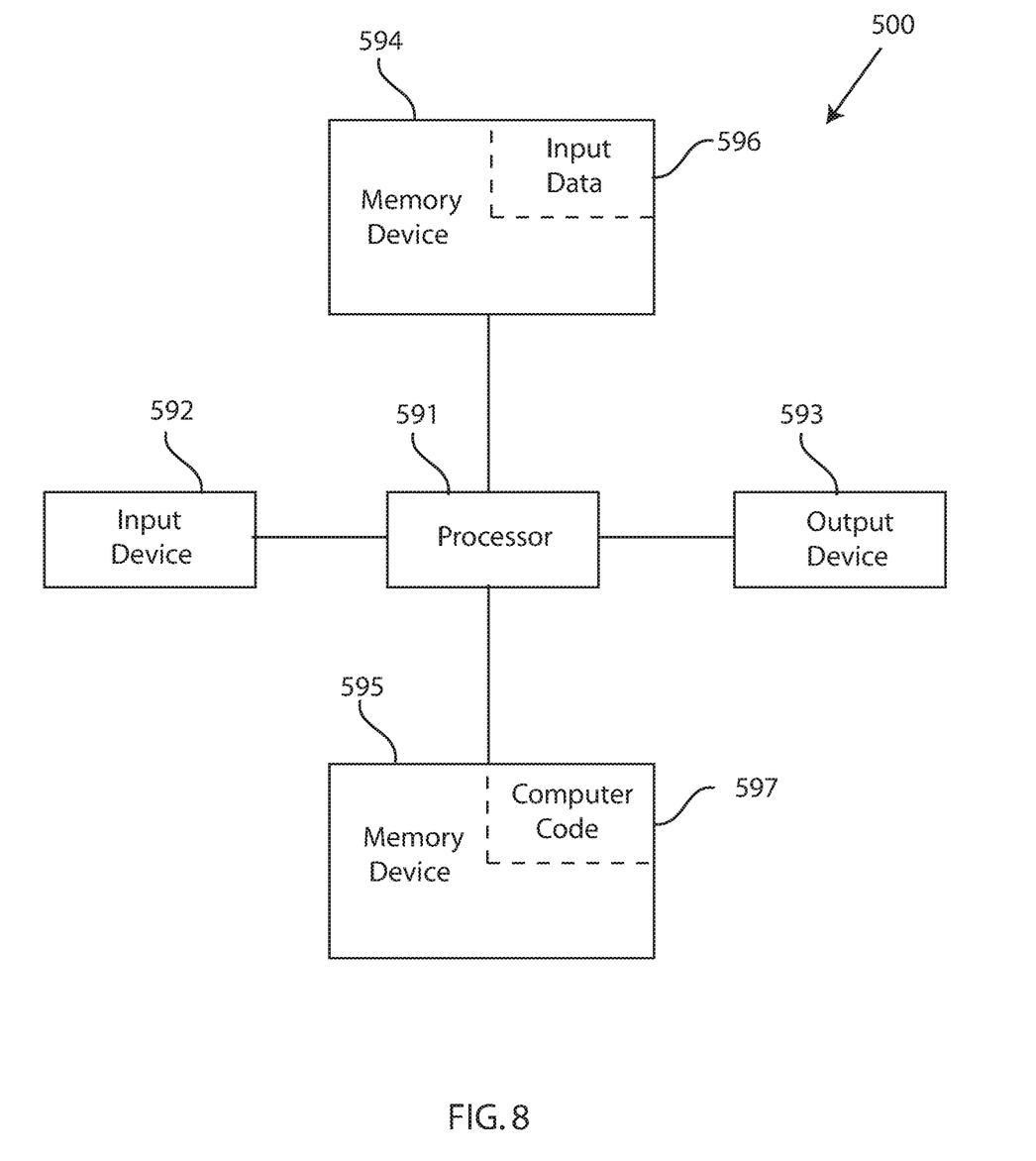
FIG. 8 illustrates a block diagram of a computer system for the secure sensitive information processing system of FIG. 1, capable of implementing methods for reducing a cybersecurity risk when using a computer to purchase products over a network of FIGS. 7-8, in accordance with embodiments of the present invention.

FIG. 8 illustrates a block diagram of a computer system 500 that may be included in the system of FIG. 1 and for implementing the methods of FIGS. 6-7 in accordance with the embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for reducing a cybersecurity risk when using a computer to purchase products over a network, in the manner prescribed by the embodiments of FIGS. 6-7 using the secure sensitive information processing system of FIGS. 1-5, wherein the instructions of the computer code 597 may be executed by processor 591 via memory device 595. The computer code 597 may include software or program instructions that may implement one or more algorithms for implementing the methods for reducing a cybersecurity risk when using a computer to purchase products over a network, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN)

or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to secure payment processing systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to reduce a cybersecurity risk when using a computer to purchase products over a network in accordance with embodiments of the present invention. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for reducing a cybersecurity risk when using a computer to purchase products over a network. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for reducing a cybersecurity risk when using a computer to purchase products over a network.

A computer program product of the present invention comprises one or more computer readable hardware storage devices having computer readable program code stored therein, the program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for reducing a cybersecurity risk using a computing system with a computer display unit and a processor connected to a product database and a user profile database that stores user identifiers and a number of a mobile device for each of the user identifiers, the method comprising:
   receiving, by the processor, a purchase request from a computer over a first network, wherein the request comprises a user identifier, product information and computer network information;
   determining, by the processor, that the first network is not secure based on the computer network information;
   accessing, by the processor, the user profile database and retrieving a mobile device number from the user profile database using the received user identifier;
   generating, by the processor, a unique identifier using the product information, wherein the unique identifier comprises a computer executable code;
   displaying, by the processor, the unique identifier on the computer display unit
   receiving, by the processor, via the computer executable code a second request over a second network, wherein the second request comprises payment information corresponding to the received user identifier; and
   executing, by the processor, the purchase transaction using the product information and the payment information.

2. The method of claim 1, wherein the unique identifier is at least one of a OR code, a shelf label, a bar code, a UPC code, a SKU number, an encrypted token, and a photograph of the product.

3. The method of claim 1, wherein the determining that the first network is unsecure includes analyzing an IP address of the computer and confirming that the IP address is connected to the Internet over a public or non-secure network.

4. A computer system
   with a processor connected to a product database and a user profile database that stores user identifiers and a number of a mobile device for each of the user identifiers;

the system comprising:
- a computer display unit coupled to the processor; and
- a non-transitory computer readable storage device coupled to the processor, wherein the storage device contains program code then when executed by the processor causes the processor to perform the steps of:
  - receiving, by the processor, a purchase request from a computer over a first network, wherein the request comprises a user identifier, product information and computer network information;
  - determining, by the processor, that the first network is not secure based on the computer network information;
  - accessing, by the processor, the user profile database and retrieving a mobile device number from the user profile database using the received user identifier;
  - generating, by the processor, a unique identifier using the product information, wherein the unique identifier comprises a computer executable code;
  - displaying, by the processor, the unique identifier on the computer display unit
  - receiving, by the processor, via the computer executable code a second request over a second network, wherein the second request comprises payment information corresponding to the received user identifier; and
- executing, by the processor, the purchase transaction using the product information and the payment information.

5. The computer system of claim 4, wherein the unique identifier is at least one of a OR code, a shelf label, a bar code, a UPC code, a SKU number, an encrypted token, and a photograph of the product.

6. The computer system of claim 4, wherein the validated user information includes biometric data from the user.

7. The computer system of claim 4, wherein the determining that the first network is unsecure includes analyzing an IP address of the computer and confirming that the IP address is connected to the Internet over a public or non-secure network.

8. A computer program product, comprising a non-transitory storage device storing a computer readable program code that when executed by a computer processor of a computing system having a computer display unit and wherein the processor is connected to a product database and user profile database storing user identifiers and a number of a mobile device for each user identifier, causes the computer processor to implement a method, the method comprising:
- receiving, by the processor, a purchase request from a computer over a first network, wherein the request comprises a user identifier, product information and computer network information;
- determining, by the processor, that the first network is not secure based on the computer network information;
- accessing, by the processor, the user profile database and retrieving a mobile device number from the user profile database using the received user identifier;
- generating, by the processor, a unique identifier using the product information, wherein the unique identifier comprises a computer executable code;
- displaying, by the processor, the unique identifier on the computer display unit
- receiving, by the processor, via the computer executable code a second request over a second network, wherein the second request comprises payment information corresponding to the received user identifier; and
- executing, by the processor, the purchase transaction using the product information and the payment information.

9. The computer program product of claim 8, wherein the unique identifier is at least one of a OR code, a shelf label, a bar code, a UPC code, a SKU number, an encrypted token, and a photograph of the product.

10. The computer program product of claim 8, wherein the validated user information includes biometric data from the user.

11. The computer program product of claim 8, wherein the determining that the first network is unsecure includes analyzing an IP address of the computer and confirming that the IP address is connected to the Internet over a public or non-secure network.

* * * * *

UNITED STATES PATENT AND TRADEMARK OFFICE
CERTIFICATE OF CORRECTION

Page 1 of 1

PATENT NO. : 10,846,689 B2
APPLICATION NO. : 15/802904
DATED : November 24, 2020
INVENTOR(S) : Mark Matthews et al.

It is certified that error appears in the above-identified patent and that said Letters Patent is hereby corrected as shown below:

In the Claims

Column 18, Line 55, Claim 2, delete "OR" and insert -- QR --, therefor.

Column 19, Line 31, Claim 5, delete "OR" and insert -- QR --, therefor.

Column 20, Line 30, Claim 9, delete "OR" and insert -- QR --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*